US012371310B2

(12) United States Patent
Lenart

(10) Patent No.: US 12,371,310 B2
(45) **Date of Patent: *Jul. 29, 2025**

(54) PRY BAR ASSEMBLY

(71) Applicants: NCH Corporation, Irving, TX (US); Edward Lenart, Farmington Hills, MI (US)

(72) Inventor: Edward Lenart, Farmington Hills, MI (US)

(73) Assignee: Danco, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,167

(22) Filed: Apr. 18, 2024

(65) Prior Publication Data

US 2024/0262668 A1 Aug. 8, 2024

Related U.S. Application Data

(63) Continuation of application No. 18/114,064, filed on Feb. 24, 2023, now Pat. No. 11,981,552, which is a continuation of application No. 17/335,425, filed on Jun. 1, 2021, now Pat. No. 11,858,790, which is a continuation of application No. 16/122,193, filed on Sep. 5, 2018, now Pat. No. 11,021,355.

(51) Int. Cl.
*B66F 15/00* (2006.01)
*B25C 11/00* (2006.01)

(52) U.S. Cl.
CPC .............. *B66F 15/00* (2013.01); *B25C 11/00* (2013.01)

(58) Field of Classification Search
CPC . B25C 11/00; B25F 1/00; B66F 15/00; E04G 23/08; B25B 31/00; B25B 27/00
See application file for complete search history.

(56) References Cited

U.S. PATENT DOCUMENTS

| | | | | |
|---|---|---|---|---|
| 3,134,574 | A | 5/1964 | Reuterfors | |
| 4,335,509 | A | 6/1982 | Smith | |
| 4,463,631 | A * | 8/1984 | Barnes | B67B 7/16 7/151 |
| 4,536,910 | A | 8/1985 | Clark | |
| 8,365,378 | B1 * | 2/2013 | Lenart | B25C 11/00 15/50.1 |
| 8,646,138 | B2 | 2/2014 | Allen et al. | |
| 8,955,827 | B2 * | 2/2015 | Brown | B25C 11/00 254/21 |

(Continued)

*Primary Examiner* — Seahee Hong
(74) *Attorney, Agent, or Firm* — Scheef & Stone, LLP; Robin L. Barnes; Mike J. Schofield

(57) ABSTRACT

A pry bar assembly includes a plate that is elongated and has a first end, a second end, a first lateral edge, a second lateral edge, an upper surface and a lower surface. The plate includes a claw section, a chisel section and a middle section positioned therebetween. The claw section includes the first end and a rounded heel. The claw section includes a first portion and a second portion. The first portion is attached to the middle section and curves upwardly and away from the middle section in a semi-cylindrical shape to form the rounded heel. The second portion extends downwardly from the first portion. The chisel section is angled upwardly from the middle section. The upper surface has an elongated crest therein that is spaced from the first and second lateral edges and extends along a length of the middle section and into the chisel section.

26 Claims, 4 Drawing Sheets

(56) References Cited

U.S. PATENT DOCUMENTS

| | | | | | |
|---|---|---|---|---|---|
| D830,144 | S | * | 10/2018 | Chiu | D8/48 |
| D831,450 | S | * | 10/2018 | Arvinte | D8/14 |
| 11,981,552 | B2 | * | 5/2024 | Lenart | B66F 15/00 |
| 2005/0062026 | A1 | | 3/2005 | Holcomb | |
| 2010/0115705 | A1 | | 5/2010 | Allen | |
| 2013/0263382 | A1 | * | 10/2013 | Sindt | B25C 11/00<br>7/166 |
| 2017/0107089 | A1 | * | 4/2017 | Lenart | B25F 1/00 |
| 2019/0376518 | A1 | * | 12/2019 | Tateno | F04B 39/00 |

* cited by examiner

PRY BAR ASSEMBLY

CROSS-REFERENCE TO RELATED APPLICATIONS

This application is a continuation of U.S. Ser. No. 18/114,064, filed on Feb. 24, 2023, which is a continuation of U.S. Ser. No. 17/335,425 filed on Jun. 21, 2022, now U.S. Pat. No. 11,858,790, which is a continuation of U.S. Ser. No. 16/122,193 filed on Sep. 5, 2018, now U.S. Pat. No. 11,021,355

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure relates to tools utilized for removing framing, wall structures, decking and the like and more particularly pertains to a construction wrecking tool for assisting a person in pulling apart structures typically held together by nails and other like fasteners.

BRIEF SUMMARY OF THE INVENTION

An embodiment of the disclosure meets the needs presented above by generally comprising a plate that is elongated and has a first end, a second end, a first lateral edge, a second lateral edge, an upper surface and a lower surface. The plate includes a claw section, a chisel section and a middle section positioned between the claw and chisel sections. The claw section includes the first end and the chisel section includes the second end and a rounded heel. The claw section includes a first portion and a second portion. The first portion is attached to the middle section and curves upwardly and away from the middle section in a semi-cylindrical shape to form the rounded heel. The second portion extends downwardly from the first portion. The chisel section is angled upwardly from the middle section. The upper surface has an elongated crest therein that is spaced from the first and second lateral edges and extends along a length of the middle section and into the chisel section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
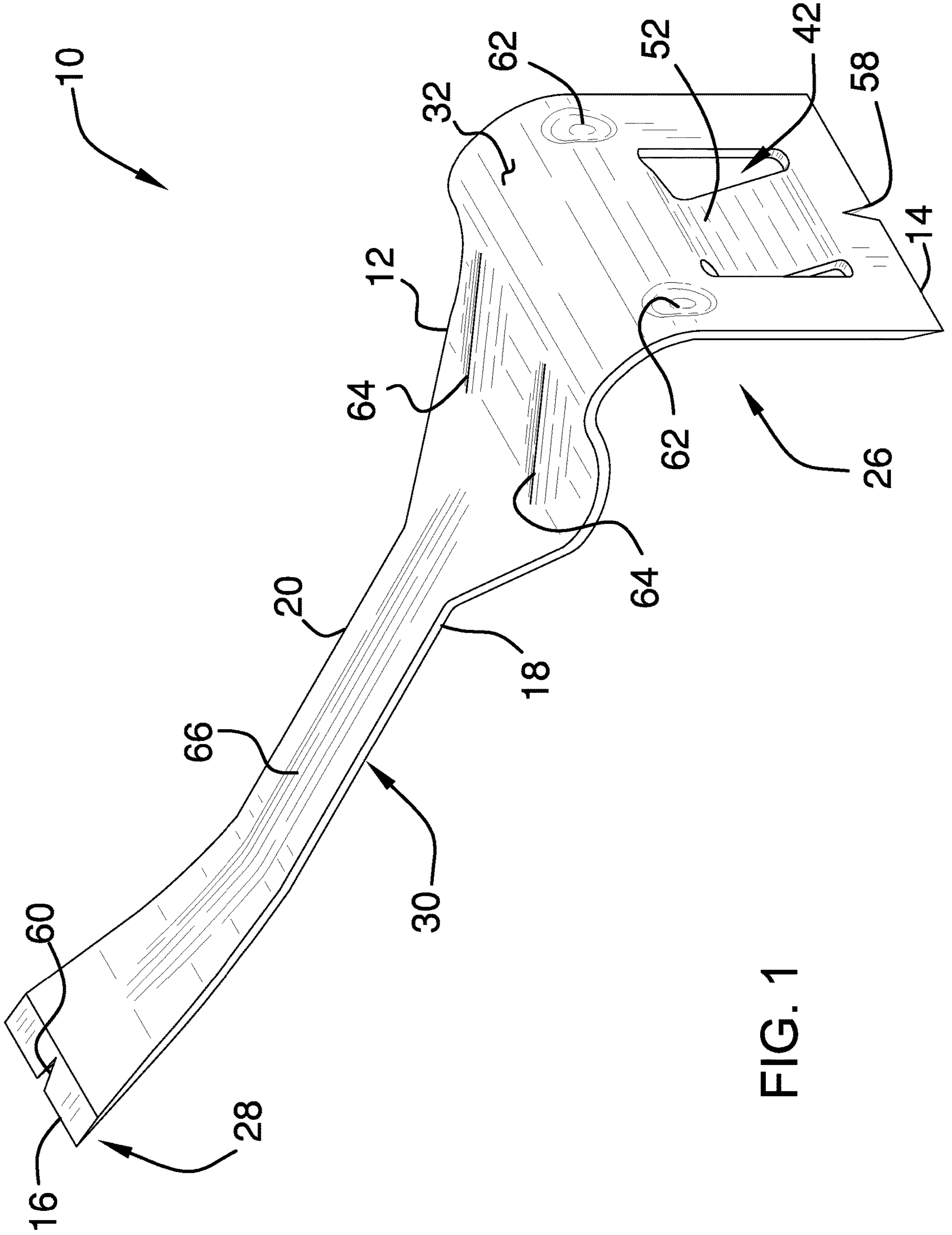
FIG. 1 is a top perspective view of a pry bar assembly according to an embodiment of the disclosure.

With reference now to the drawings, and in particular to FIGS. 1 through 6 thereof, a new structure deconstruction device embodying the principles and concepts of an embodiment of the disclosure and generally designated by the reference numeral 10 will be described.

As best illustrated in FIGS. 1 through 6, the pry bar assembly 10 generally comprises a plate 12 that is elongated and has a first end 14, a second end 16, a first lateral edge 18, a second lateral edge 20, an upper surface 22 and a lower surface 24. It should be understood that the terms such "upper" and "lower" are being utilized to facilitate clarity when describing the assembly 10 but as the assembly 10 may be used in any direction or orientation these terms should not be considered either definitive or static. The plate 12 extends laterally generally between 10.0 inches and 24.0 inches, though the plate 12 is longer along its surface due to bends positioned therein. Also, while this would be a typical length, a length greater than thus, such as up 36.0 inches may be feasible. The plate 12 includes a claw section 26, a chisel section 28 and a middle section 30 positioned between the claw 26 and chisel 28 sections. As can be seen in the Figures, the middle section 30 may comprise the narrowest portion of the plate 12 wherein the first 18 and second 20 lateral edges diverge from each other as they extend from the middle section 30 to either of the first 14 or second 16 ends. The first end 14 has a width typically between 3.5 inches and 5.0 inches and the second end 16 typically has a width between 2.0 inches and 3.0 inches though other sizes may be useful depending upon usage. The middle section 30 may have a width between 1.0 inch and 2.0 inches from the first lateral edge 18 to the second lateral edge 20.

The claw section (or second section) 26 includes the first end 14 and the chisel section (or third section) 28 includes the second end 16. Moreover, as may typically be found on a pry bar, the claw section 26 may include a rounded heel 32. The middle section (or first section) 30 may be substantially straight from the chisel section 28 to the claw section 26 such that the first 18 and second 20 lateral edges of the middle section 30 lie in a shared horizontal plane.

Figure 2:
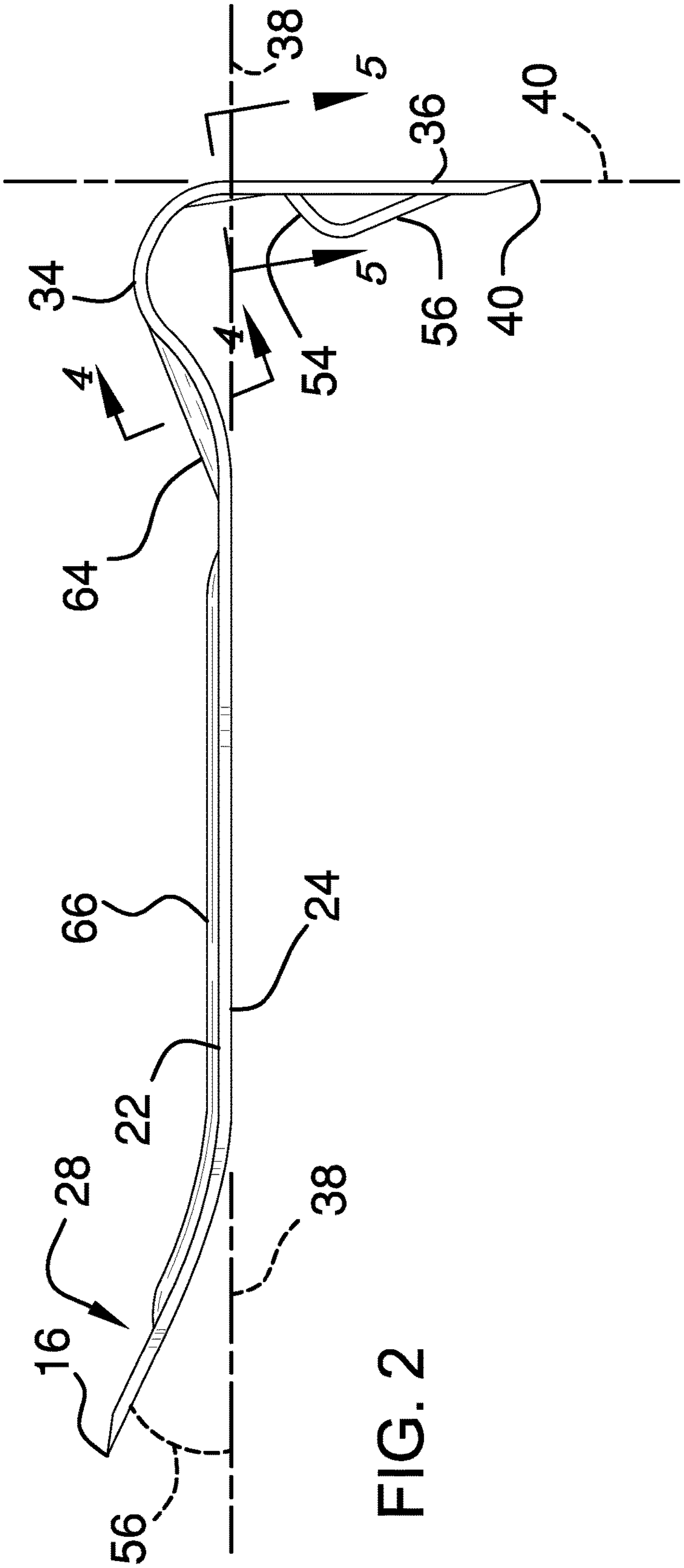
FIG. 2 is a side view of an embodiment of the disclosure.

The claw section 26 includes a second claw portion 34 and a first claw portion 36. The first second claw portion 34 is attached to the middle section 30 and curves upwardly and away from the middle section 30 in a semi-cylindrical shape to form the rounded heel 32. The first claw portion 36 extends downwardly from the second claw portion 34 such that the shared horizontal plane 38 of the middle section 30 intersects the first claw portion 36. The first claw portion 36 lies in a plane 40 orientated perpendicular to the shared horizontal plane 38. FIG. 2 depicts these planes 38, 40 from a side view.

The first claw portion 36 of the claw section (or second section) 26 has an aperture 42 extending therethrough. The aperture 42 has an upper edge 44, a lower edge 46, a first side edge 48 and a second side edge 50. A pry panel 52 is integrally attached to and extends between the upper 44 and lower 46 edges. The pry panel 52 is bowed inwardly toward the second end 16. More particularly, the pry panel 52 may form a triangle wherein the pry panel 52 forms two legs and the third leg is a plane of the aperture 42. The pry panel 52 includes a short leg 54 and a long leg 56 where the short leg 54 is positioned nearer to the second claw portion 34. The long leg 56 may form an angle with a plane of the aperture 42 between 20° and 25° while the short leg 54 may form an angle with the plane of the aperture 42 between 40° and 50°. The aperture is generally rectangular shaped and may have a length and a width each between 2.0 inches and 4.0 inches.

The chisel section (or third section) 28 is angled upwardly from the middle section 30. More specifically, the chisel section 28, from the middle section 30 to the second end 16, is angled upwardly to form an angle 56 between about 20° and 30° with respect to the shared plane 38. This will provide more leverage when the chisel section 28 is used to remove fasteners or is to be extended between two structural components typically held together by nails, screws and the like.

The first end 14 is tapered to a sharpened edge wherein the lower surface 24 adjacent to the first end 14 is angled toward the upper surface 22. A notch 58 extends into the first end 14 and is positioned between the first 18 and second 20 lateral edges. The second end 16 is tapered to a sharpened edge wherein the upper surface 22 adjacent to the second end 16 is angled toward the lower surface 24. A notch 60 extends into the second end 16 and is positioned between the first 18 and second 20 lateral edges. The notch 58 in the first end 14 and the notch 60 in the second end 16 are each V-shaped and form angles between 15° and 25°. Each of the first 14 and second 16 ends forms an angle being between about 15° and 25°.

Figure 3:
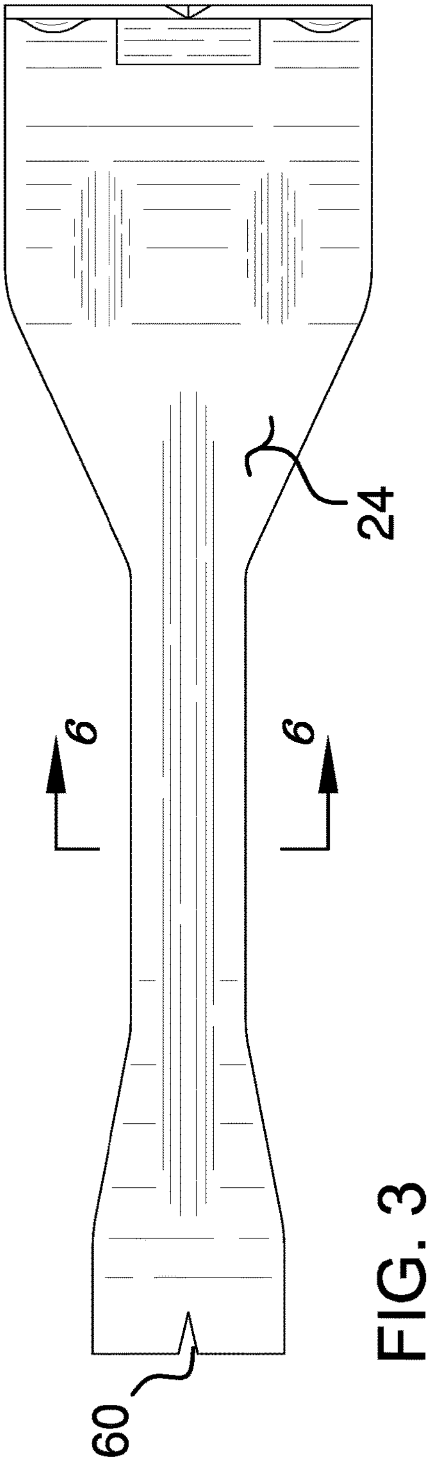
FIG. 3 is a bottom view of an embodiment of the disclosure.
Figure 4:
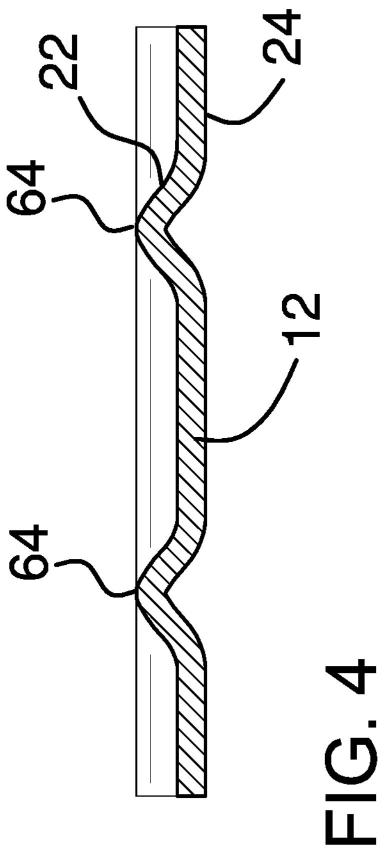
FIG. 4 is a cross-sectional view of an embodiment of the disclosure taken along line 4-4 of FIG. 2.
Figure 5:
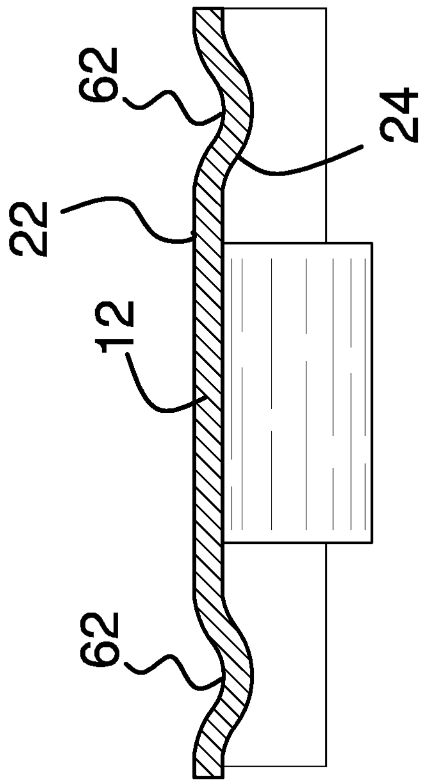
FIG. 5 is a cross-sectional view of an embodiment of the disclosure taken along line 5-5 of FIG. 2.
Figure 6:
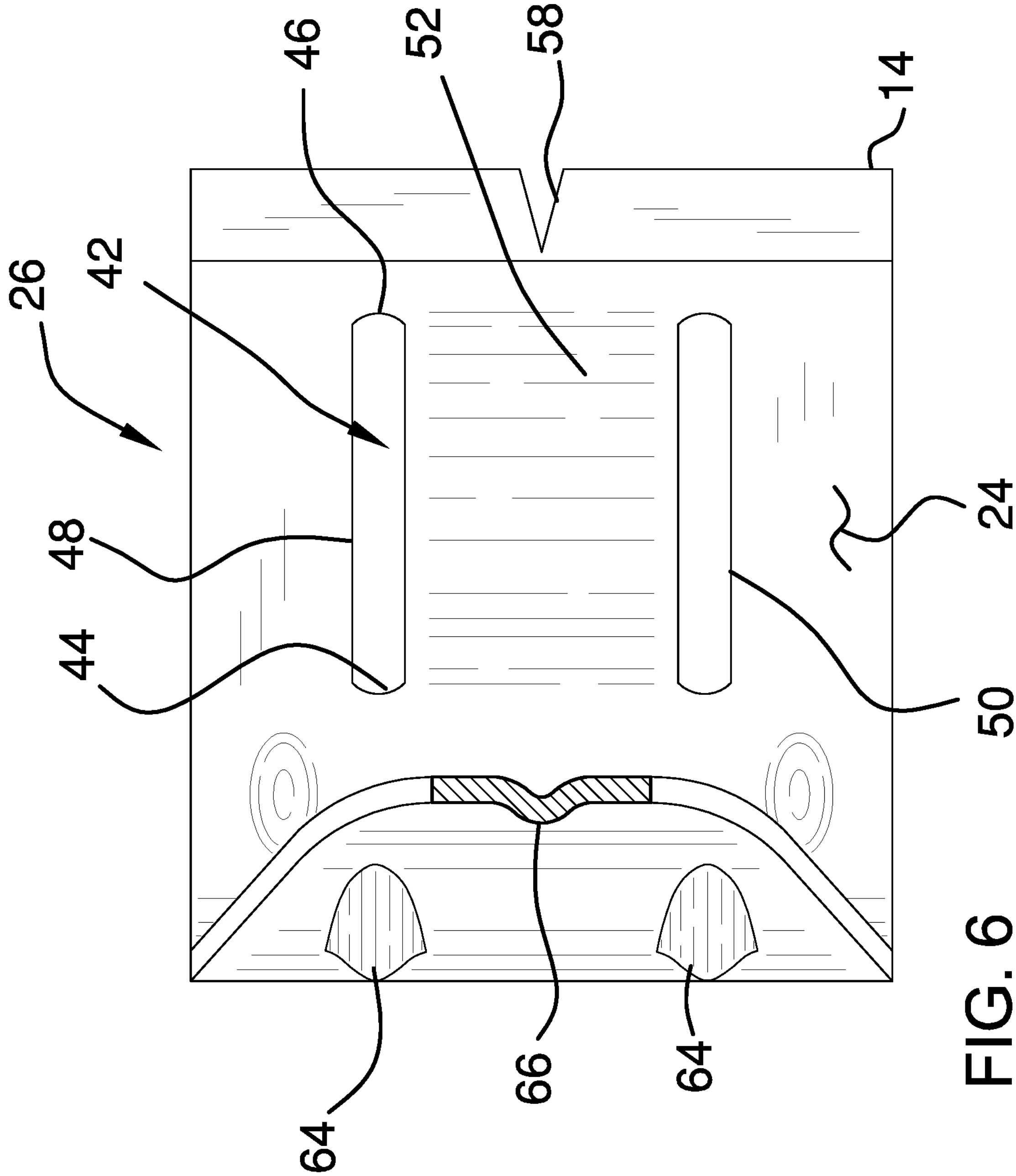
FIG. 6 is a cross-sectional view of an embodiment of the disclosure taken along line 6-6 of FIG. 3.

The claw section 26 has a pair of indentations 62 therein extending into the upper surface 22 which causes bowing outwardly of corresponding areas in the lower surface 24. The indentations 62 are laterally spaced from each other. The indentations are positioned 62 in the second portion 36, opposite the first edge 14 and adjacent to the heel 32. The upper surface 22 of the claw section 26 includes a pair of ridges 64 that are laterally spaced from each other and are positioned in the second claw portion 34. The ridges 64 cause corresponding depressions on the lower surface as can be seen in FIG. 4. The upper surface 22 has an elongated crest 66 therein. As can be seen in FIGS. 1 and 2, the crest 66 is spaced from the first 18 and second lateral 20 edges and the crest 66 extends along a length of the middle section 30 and into the chisel section 28. FIG. 3 depicts an elongated channel corresponding to the crest 66. The crest 66, ridges 64 and depressions 62 each strengthen the plate 12 to prevent its bending along these points when force is placed on the first end 14, second end 16, or heel 32. The crest 66, ridges 64 and depressions 62 each have curved lower 24 and upper 22 surfaces to further add rigidity to the plate 12.

In use, the pry bar assembly 10 is used in a conventional manner for removing fasteners, such as nails, and for pulling apart structural components and thus act as a "wrecking" tool for deconstruction purposes. However, the unique shape of the assembly 10 provides for greater strength as the plate 12 will not easily bend while being used. This allows the assembly 10 to be more light weight and have a thickness of less than 0.17 inches.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be only one of the elements.

I claim:

1. A pry tool comprising:

a handle section comprising a longitudinal axis in a first plane;

a claw section extending from the handle section, the claw section comprising a first claw portion and a pry panel;

wherein the first claw portion comprises a first lateral edge, a second lateral edge, and a first end disposed between the first lateral edge and the second lateral edge;

wherein the first lateral edge and the second lateral edge are disposed in a second plane substantially perpendicular to the first plane;

wherein the pry panel is asymmetrically bowed and extends inwardly from the first claw portion toward the handle section; and wherein the pry panel is connected at a first end to the first claw portion and at a second end to the first claw portion.

2. The pry tool according to claim 1 wherein the pry panel comprises a first panel comprising the first end of the pry panel and a second panel comprising the second end of the pry panel.

3. The pry tool according to claim 2 wherein the first panel has a first length, the second panel has a second length, and wherein the first length is longer than the second length.

4. The pry tool according to claim 2 wherein the first panel and the second panel are joined together at a location disposed closer to the handle section than to the first end of the first claw portion.

5. The pry tool according to claim 4 wherein the pry panel is disposed centrally between the first lateral edge and the second lateral edge of the first claw portion.

6. The pry tool according to claim 5 wherein there is a single pry panel.

7. The pry tool according to claim 1 wherein there is a single pry panel.

8. The pry tool according to claim 1 wherein the claw section comprises a second claw portion disposed between the handle section and the first claw portion.

9. The pry tool according to claim 8 wherein the second claw portion comprises a rear portion extending from the handle section toward the first claw portion and a forward portion extending from the rear portion toward the first claw portion.

10. The pry tool according to claim 9 wherein the rear portion is disposed within or parallel to the first plane.

11. The pry tool according to claim 9 wherein the rear portion comprises a third lateral edge and a fourth lateral edge; and wherein the third lateral edge and the fourth lateral edge each extend forwardly and extend outwardly from the handle section at an angle relative to the longitudinal axis.

12. The pry tool according to claim 9 wherein the rear portion comprises a third lateral edge and a fourth lateral edge that are each disposed in the first plane.

13. The pry tool according to claim 12 wherein the forward portion comprises a fifth lateral edge and a sixth lateral edge; and wherein the first lateral edge and the second lateral edge of the first claw portion extend in a downward direction relative to the handle section;

wherein at least a portion of the fifth lateral edge and the sixth lateral edge extending away from the first plane and in an upward direction relative to the handle section.

14. The pry tool according to claim 13 wherein the claw section further comprises a rounded heel disposed between the forward portion of the second claw portion and a second end of the first claw portion.

15. The pry tool according to claim 8 wherein at least a portion of the second claw portion is disposed within the first plane.

16. The pry tool according to claim 1 wherein at least a portion of the claw section is disposed within the first plane.

17. The pry tool according to claim 1 wherein the longitudinal axis is a first longitudinal axis and wherein at least a portion of the claw section comprises a second longitudinal axis.

18. The pry tool according to claim 17 wherein the second longitudinal axis is in the first plane.

19. The pry tool according to claim 18 wherein the portion of the claw section comprising the second longitudinal axis comprises a third lateral edge and a fourth lateral edge that each extend forwardly and extend outwardly from the handle section at an angle relative to the longitudinal axis.

20. The pry tool according to claim 2 wherein the first panel forms an angle relative to the second plane of around 20-25 degrees and the second panel forms an angle relative to the second plane of around 40-50 degrees.

21. The pry tool according to claim 1 further comprising a chisel section extending from the handle section and distal to the claw section;

wherein the chisel section is angled away from the first claw portion relative to the longitudinal axis and forms an angle relative to the first plane of around 20-30 degrees.

22. The pry tool according to claim 1 wherein the pry panel is integrally formed with the first claw portion.

23. The pry tool according to claim 1 wherein the first claw portion comprises a first aperture and a second aperture and the pry panel is disposed between the first aperture and the second aperture.

24. The pry tool according to claim 1 wherein the claw section further comprises a second claw portion disposed between the handle section and the first claw portion;

wherein the second claw portion has a first width near the first claw portion and the first claw portion has a second width; and wherein the first width and the second width are substantially similar.

25. The pry tool according to claim 24 wherein the first claw portion and the second claw portion are integrally formed.

26. The pry tool according to claim 25 wherein the second claw portion comprises a forward section comprising the first width and a rearward section extending from the handle section;

wherein the handle section has a third width that is narrower than the second width; and wherein the rearward section has a widening width as the rearward section extends from the handle section toward the forward section.

* * * * *